United States Patent
Shiraki (10) Patent No.: US 7,760,763 B2
(45) Date of Patent: Jul. 20, 2010

(54) PACKET TRANSFER CONTROLLING APPARATUS AND PACKET TRANSFER CONTROLLING METHOD

(75) Inventor: Osamu Shiraki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 45 days.

(21) Appl. No.: 12/339,472

(22) Filed: Dec. 19, 2008

(65) Prior Publication Data
US 2009/0262735 A1 Oct. 22, 2009

(30) Foreign Application Priority Data
Apr. 21, 2008 (JP) .............................. 2008-110209

(51) Int. Cl.
*H04J 3/26* (2006.01)
(52) U.S. Cl. ...................................... 370/469
(58) Field of Classification Search ....................... None
See application file for complete search history.

(56) References Cited

U.S. PATENT DOCUMENTS

| | | | | |
|---|---|---|---|---|
| 7,069,372 B1 * | 6/2006 | Leung et al. | ................ | 710/306 |
| 2008/0201772 A1 * | 8/2008 | Mondaeev et al. | ............ | 726/13 |
| 2009/0141740 A1 * | 6/2009 | Baruah et al. | ................ | 370/469 |
| 2009/0213858 A1 * | 8/2009 | Dolganow et al. | ........ | 370/395.5 |
| 2009/0285225 A1 * | 11/2009 | Dahod | ......................... | 370/401 |
| 2009/0316698 A1 * | 12/2009 | Menten | ...................... | 370/392 |

FOREIGN PATENT DOCUMENTS

JP  2004-173148  6/2004

* cited by examiner

*Primary Examiner*—Chirag G Shah
*Assistant Examiner*—Amarnauth Persaud
(74) *Attorney, Agent, or Firm*—Katten Muchin Rosenman LLP (57) ABSTRACT

A packet transfer controlling apparatus includes a depth storage unit that stores a pattern and a depth in association with each other. When accepting a setting of the pattern, the apparatus searches the depth storage unit by using the accepted pattern to obtain the depth stored in association with the pattern, thereby deriving the depth of the information to be extracted from the input packet. Upon accepting the input of the packet, information is extracted sequentially from the head of the packet. The apparatus determines whether the extracted information is positioned at a location deeper than the derived depth. When determining that the extracted information is not yet positioned at a location deeper than the derived depth, the apparatus continues extraction of information. When determining that the extracted information is positioned at a location deeper than the depth, the apparatus ends extraction of information.

4 Claims, 6 Drawing Sheets

PACKET TRANSFER CONTROLLING APPARATUS AND PACKET TRANSFER CONTROLLING METHOD

CROSS-REFERENCE TO RELATED APPLICATIONS

This application is based upon and claims the benefit of priority of the prior Japanese Patent Application No. 2008-110209, filed on Apr. 21, 2008, the entire contents of which are incorporated herein by reference.

BACKGROUND

1. Field

The present invention relates to a packet transfer controlling apparatus and packet transfer controlling method.

2. Description of the Related Art

Apparatuses such as network devices and computers connected to a network generally set an Access Control List (ACL) for the purpose of, for example, preventing unauthorized access via the network (for example, refer to Japanese Patent Application Laid-open No. 2004-173148). Also, such apparatuses as network devices and computers set the access control list for the purpose of, for example, changing a destination of packet transfer according to communication.

Figure 7:
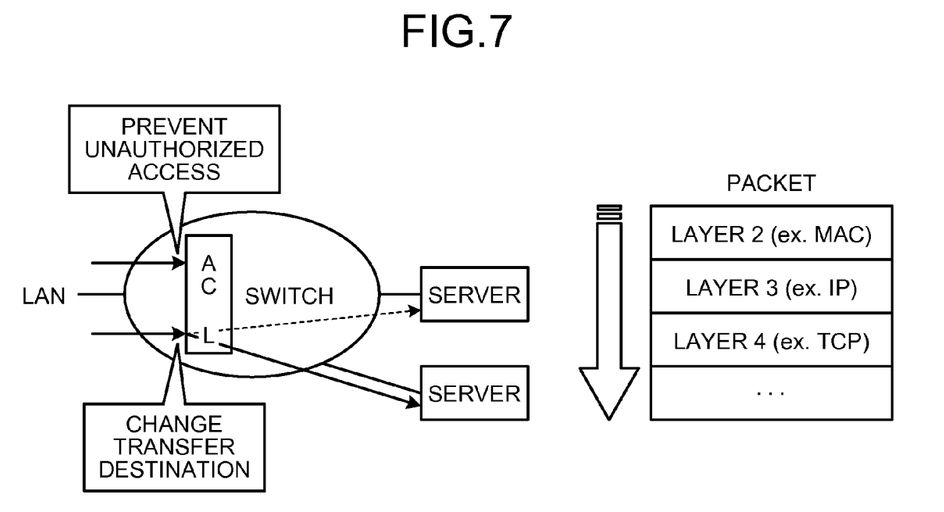
FIG. 7 is a drawing for explaining an access control list.

For example, as depicted in FIG. 7, a switch, which is a network device, sets an access control list on a receiving port side connecting to a Local Area Network (LAN). At this time, the switch sets the access control list with a rule described according to a pattern. Here, the pattern is a type indicating which information included in a packet is used as a comparison target for matching, that is, a type of information to be extracted from the packet in controlling a transfer of the packet. The switch then compares the information included in the packet input to the switch with the rule, thereby preventing unauthorized access or changing a server of a transfer destination. At this time, as denoted in FIG. 7 by way of example, the switch extracts information, such as so-called layer 2, layer 3, and layer 4 defined by Open Systems Interconnection (OSI) in sequence from the head of the packet. FIG. 7 is a drawing for explaining an access control list.

Figure 8:
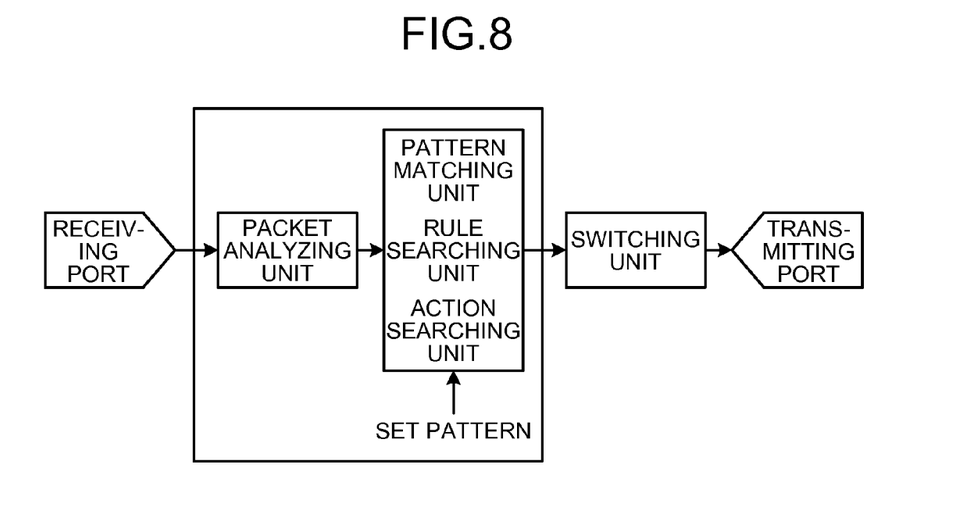
FIG. 8 is a drawing for explaining a conventional technology.

By using FIG. 8, the configuration of a conventional switch set with an access control list is briefly explained. FIG. 8 is a drawing for explaining a conventional technology. As depicted in FIG. 8, in the conventional switch, upon accepting an input of a packet from a receiving port, a packet analyzing unit extracts information included in the packet from the packet. Then, a pattern matching unit matches the extracted information with a pattern set in advance with a specific comparison value to see whether the extracted information matches the pattern and output its result. Then, a rule searching unit searches for a rule by using the comparison result, and an action searching unit searches for an action by using the found rule. Then, a switching unit controls packet transfer based on the found action.

Meanwhile, the conventional technology explained above has a problem of increasing latency in association with extraction of information.

That is, as explained above, in access control, the apparatus set with the access control list has to extract information for use in pattern matching from the packet. At this time, the conventional apparatus extracts information at an across-the-board depth irrespectively of the depth of information required for pattern matching (the position of the information represented by a depth from the head of the packet). For this reason, even when the depth required for pattern matching is shallow, the conventional apparatus does not allow the switching unit to perform packet transfer unless extracting information at the across-the-board depth and ending extraction. As a result, the conventional apparatus has a problem of increasing latency for the time of extracting unnecessary information.

SUMMARY

It is an object of the present invention to at least partially solve the problems in the conventional technology.

According to an aspect of an embodiment, a packet transfer controlling apparatus includes a depth storage unit that stores, in controlling transfer of a packet, a pattern indicative of a type of information to be extracted from the packet and a depth from a head of the packet, the depth being indicative of a position of the information to be extracted, and the pattern and the depth being stored in association with each other; a depth deriving unit that derives, when a setting of the pattern is accepted, the depth of the information to be extracted from the input packet by searching the depth storage unit based on the pattern and obtaining the depth stored in association with the pattern; an extracting unit that sequentially extracts the information from the head of the packet when the input of the packet is accepted; and a determining unit that determines whether the information extracted by the extracting unit is positioned at a location deeper than the depth derived by the depth deriving unit, and controls to continue the information extraction by the extracting unit when determining that the information is not yet positioned at the location deeper than the derived depth, and to end the information extraction by the extracting unit when determining that the information is positioned at the location deeper than the derived depth.

According to another aspect of an embodiment, a packet transfer controlling method includes deriving, in controlling transfer of a packet, when a setting of a pattern indicative of a type of information to be extracted from the packet is accepted, a depth of the information to be extracted from the input packet by searching a depth storage unit based on the accepted pattern, the depth storage unit storing the pattern and the depth, the depth being indicative of a position of the information to be extracted, and the pattern and the depth being stored in association with each other, and by obtaining the depth stored in the depth storage unit in association with the pattern; extracting the information from a head of the packet in sequence when the input of the packet is accepted; and determining whether the extracted information is positioned at a location deeper than the derived depth, and controls to continue the information extraction when determining that the information is not yet positioned at the location deeper than the derived depth, and to end the information extraction when determining that the information is positioned at the location deeper than the derived depth.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

With reference to the attached drawings, exemplary embodiments of the packet transfer controlling apparatus and packet transfer controlling method according to the present invention are explained in detail below. Note that, in the following, a general outline of a packet transfer controlling apparatus according to a first embodiment is first explained, and then the configuration, process procedure, and effects of the packet transfer controlling apparatus according to the first embodiment are explained. Then, other embodiments are explained.

Figure 1:
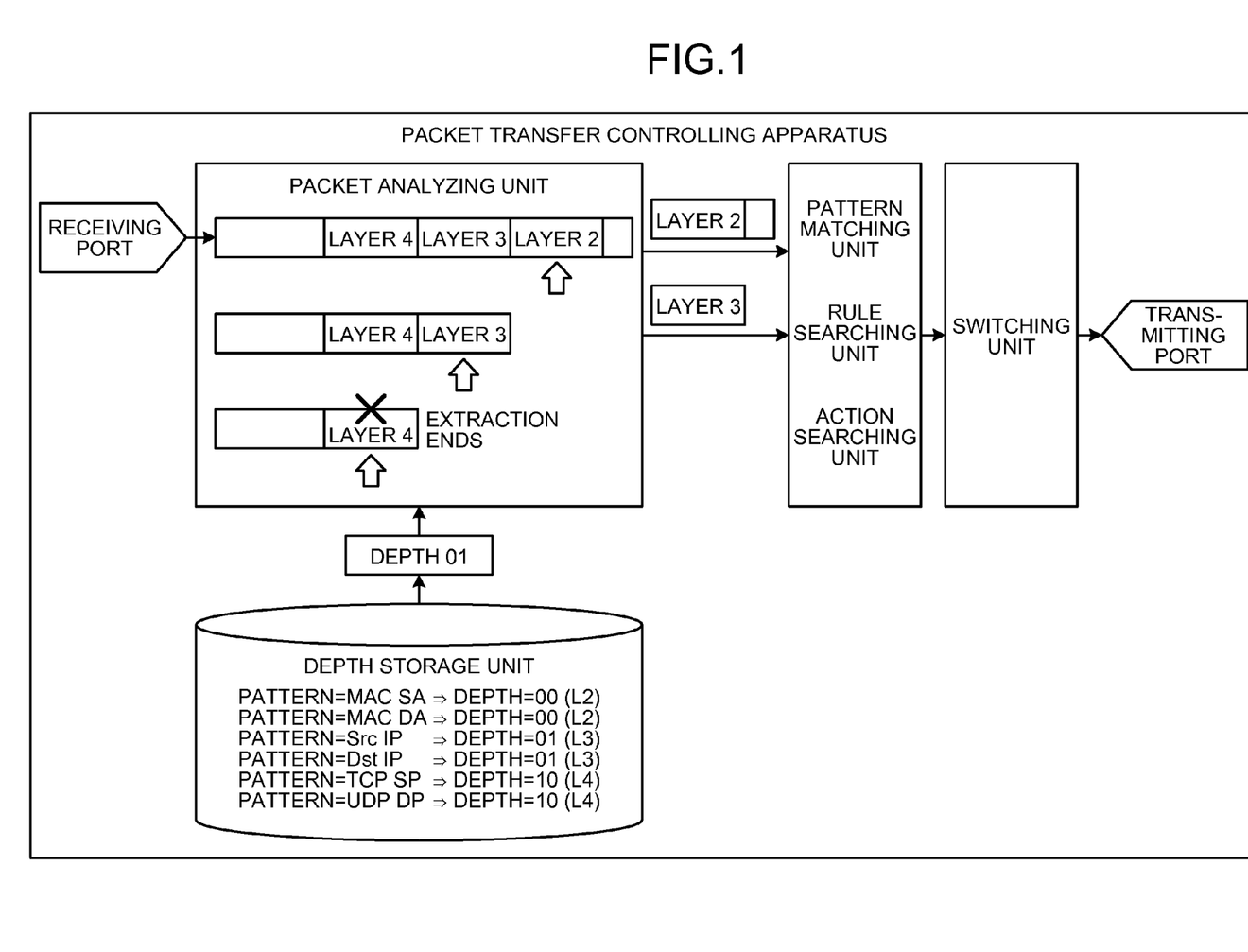
FIG. 1 is a drawing for explaining a general outline of a packet transfer controlling apparatus according to a first embodiment.

First, by using FIG. 1, the general outline of the packet transfer controlling apparatus according to the first embodiment is explained. FIG. 1 is a drawing for explaining the general outline of the packet transfer controlling apparatus according to the first embodiment.

The packet transfer controlling apparatus according to the first embodiment includes, as with the conventional apparatus, a packet analyzing unit, a pattern matching unit, a rule searching unit, an action searching unit, and a switching unit. However, the packet transfer controlling apparatus according to the first embodiment is different from the conventional apparatus in that the depth of information to be extracted from an input packet is derived and that extraction of information by the packet analyzing unit is controlled based on the derived depth.

Specifically, the packet transfer controlling apparatus according to the first embodiment includes a depth storage unit, as depicted in FIG. 1. The depth storage unit stores a pattern and a depth in association with each other. Here, the pattern represents a type of information to be extracted from a packet in controlling a transfer of the packet, such as "MAC SA" (Media Access Control (MAC) address of a transmitting source) and "Src IP" (Internet Protocol (IP) address of a transmitting source). The depth represents the position of the information to be extracted from a packet in controlling a transfer of the packet by the depth from the head of packet, such as "00" (binary number) (L2) and "01" (L3). That is, an association of "MAC SA" and "00" (L2) means that, since the information to be extracted from the packet is a MAC address, the depth of the information to be extracted is the depth of layer 2.

Also, as depicted in FIG. 1, the packet transfer controlling apparatus according to the first embodiment derives the depth of the information to be extracted from the input packet. Specifically, when accepting a setting of a pattern, the packet transfer controlling apparatus searches the depth storage unit by using the accepted pattern to obtain a depth stored in association with the pattern, thereby deriving the depth. For example, when accepting a setting of a pattern of "Src IP" (IP address of a transmitting source), the packet transfer controlling apparatus searches the depth storage unit by using "Src IP" to obtain a depth "01", thereby deriving the depth "01".

In this manner, the packet transfer controlling apparatus according to the first embodiment controls packet transfer based on the derived depth. Specifically, upon extraction of information, the packet analyzing unit of the packet transfer controlling apparatus determines whether the extracted information is positioned at a location deeper than the derived depth. When the packet analyzing unit determines that the information is not yet positioned at a location deeper than the depth, extraction of information continues. When the packet analyzing unit determines that the information is positioned at a location deeper than the depth, extraction of information ends.

For example, upon extraction of information of layer 2, the packet analyzing unit determines whether the extracted information is positioned at a location deeper than the depth "01". The packet analyzing unit determines that the extracted information is not yet positioned at a location deeper than the depth "01", and then transmits the extracted information of layer 2 to the pattern matching unit, and makes a transition to extraction of information of layer 3. Upon extraction of information of layer 3, the packet analyzing unit then determines whether the extracted information is positioned at a location deeper than the depth "01". The packet analyzing unit determines that the extracted information is not yet positioned at a location deeper than the depth "01", and then transmits the extracted information of layer 3 to the pattern matching unit, and makes a transition to extraction of information of layer 4. Upon extraction of information of layer 4, the packet analyzing unit then determines whether the extracted information is positioned at a location deeper than the depth "01". The packet analyzing unit determines that the extracted information is positioned at a location deeper than the depth "01", and then ends extraction of information.

In this manner, unlike the conventional technique of extracting information at an across-the-board depth irrespectively the depth of information required for pattern matching, the packet transfer controlling apparatus according to the first embodiment can reduce latency in association with extraction of information.

Figure 2:
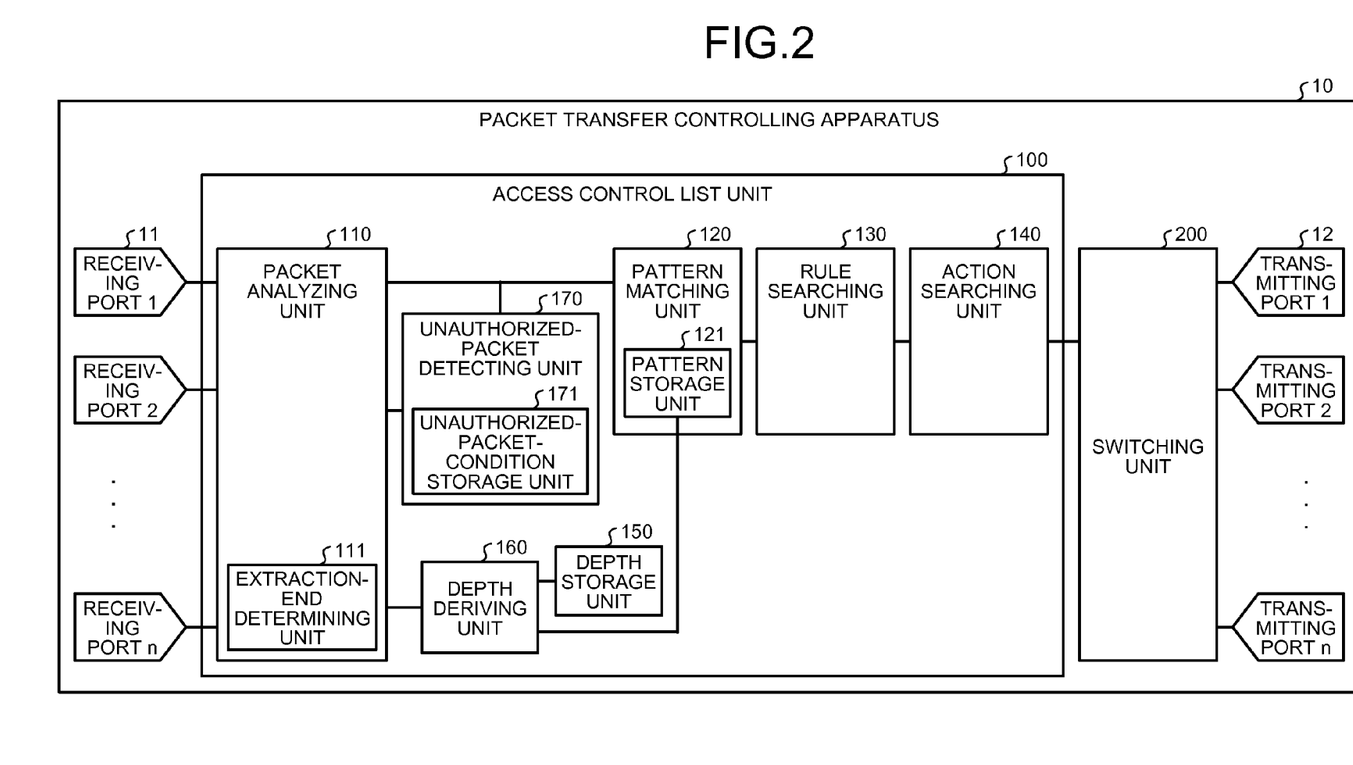
FIG. 2 is a block diagram of the configuration of the packet transfer controlling apparatus according to the first embodiment.
Figure 3:
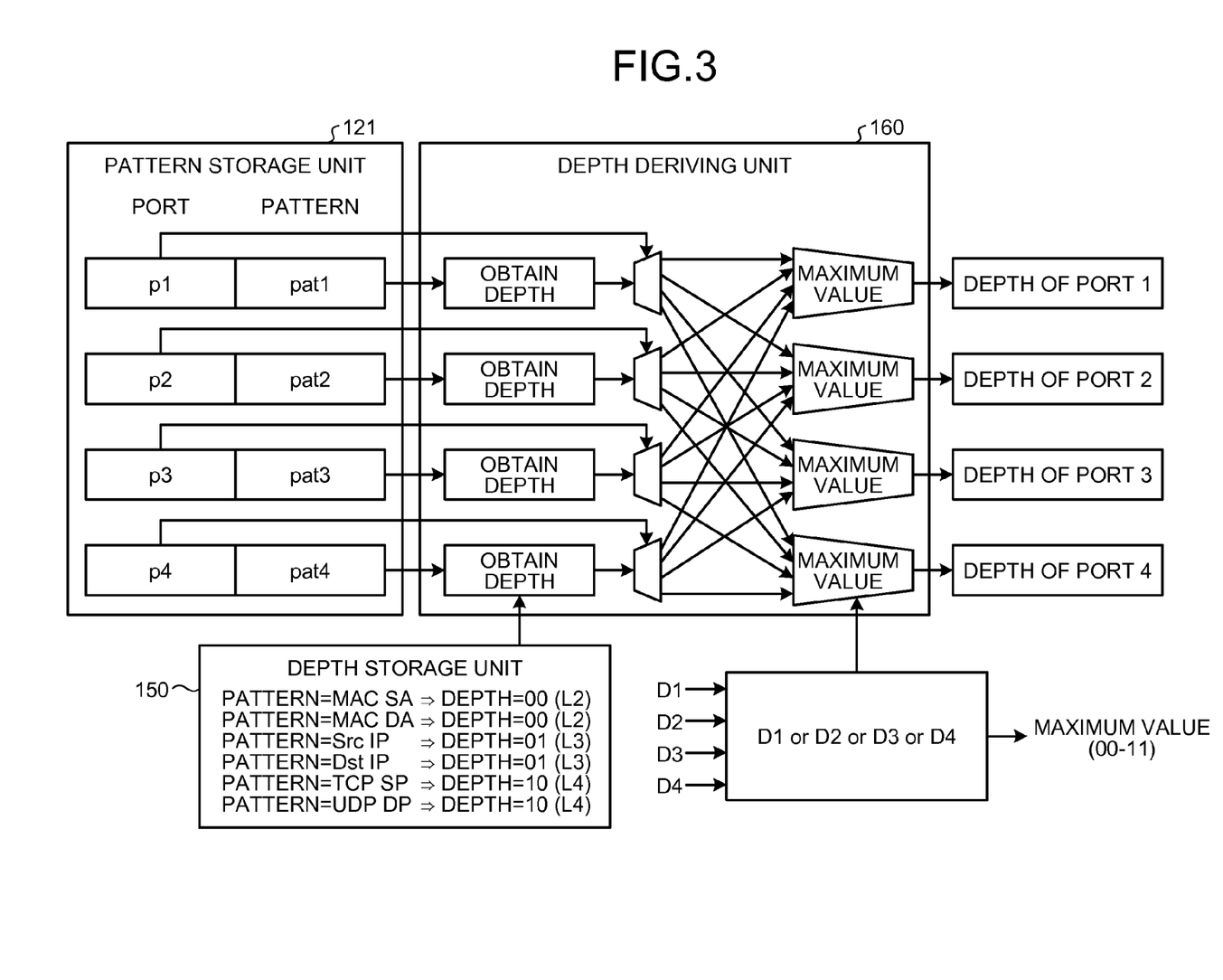
FIG. 3 is a drawing for explaining a depth deriving unit.

Next, by using FIGS. 2 and 3, the configuration of the packet transfer controlling apparatus according to the first embodiment is explained. FIG. 2 is a block diagram of the configuration of the packet transfer controlling apparatus according to the first embodiment. FIG. 3 is a drawing for explaining the depth deriving unit.

As depicted in FIG. 2, a packet transfer controlling apparatus 10 includes, among other things, receiving ports 11, transmitting ports 12, an access control list unit 100, and a switching unit 200.

Each of the receiving ports 11 receives a packet. Each of the transmitting ports 12 transmits a packet. When an action is transferred from the access control list unit 100, the switching unit 200 controls packet transfer according to the transferred action, such as transmitting the packet to a relevant one of the transmitting ports 12 or discarding the packet. Also, when informed by an unauthorized-packet detecting unit 170 that an unauthorized packet has been detected, the switching unit 200 discards the unauthorized packet.

As depicted in FIG. 2, the access control list unit 100 includes, among other things, a packet analyzing unit 110, a pattern matching unit 120, a rule searching unit 130, and an action searching unit 140.

The packet analyzing unit 110 analyzes the packet and extracts, from the packet, information included in the packet. Specifically, upon accepting an input of a packet from any of the receiving ports 11, the packet analyzing unit 110 extracts, from the packet, information included in the packet, and transfers the information to the pattern matching unit 120.

Meanwhile, the packet analyzing unit 110 includes an extraction-end determining unit 111. When information is extracted by the packet analyzing unit 110 from the packet, the extraction-end determining unit 111 determines whether the extracted information is positioned at a location deeper than the depth derived by a depth deriving unit 160, which will be explained further below. When determining that the extracted information is not yet positioned at a location deeper than the depth, the extraction-end determining unit 111 lets the packet analyzing unit 110 continue extraction of information. When determining that the extracted information is positioned at a location deeper than the depth, the extraction-end determining unit 111 ends extraction of information being performed by the packet analyzing unit 110.

Also, upon being informed by the unauthorized-packet detecting unit 170, which will be explained further below, that an unauthorized packet has been detected, the packet analyzing unit 110 in the first embodiment ends extraction of information.

The pattern matching unit 120 outputs the matching result for searching for a rule. Also, as depicted in FIG. 2, the pattern matching unit 120 includes a pattern storage unit 121.

The pattern storage unit 121 stores information about the port and a pattern in association with each other. For example, as depicted in FIG. 3, the pattern storage unit 121 stores "p1" and "pat1" in association with each other. Here, "p1" represents information collectively representing port numbers with a type of information to be extracted from the packet being "pat1". For example, "p1" represents three port numbers of "port 1", "port 2", and "port 3".

Although not depicted, the pattern matching unit 120 also stores a specific comparison value for matching with the information extracted from the packet. When information is transferred from the packet analyzing unit 110, the pattern matching unit 120 performs pattern matching by matching the information with the specific comparison value stored in advance, and then outputs the matching result for transfer to the rule searching unit 130.

The rule searching unit 130 searches for a rule by using the matching result. Specifically, although not depicted, the rule searching unit 130 includes a rule storage unit and, when the matching result by the pattern matching unit 120 is output, the rule searching unit 130 performs a search to see which rule the input packet is relevant to among a plurality of rules stored in the rule storage unit. As a result, the rule searching unit 130 will search for a rule matching with the matching result or a rule described as "Don't care". The rule searching unit 130 then outputs a rule number that identifies the found rule.

The action searching unit 140 searches for an action by using the rule number. Specifically, although not depicted, the action searching unit 140 includes an action storage unit. For example, the action storage unit stores a plurality of associations of a rule number and an action, for example, "Discard the packet without transfer".

Also, when the rule number is output by the rule searching unit 130, the action searching unit 140 searches the action storage unit by using the output rule number to obtain an action stored in association with the rule number. The action searching unit 140 then transfers the obtained action to the switching unit 200.

A depth storage unit 150 stores a pattern and a depth in association with each other. Here, the pattern represents a type of information to be extracted from a packet in controlling a transfer of the packet, such as "MAC SA" (MAC address of a transmitting source) and "Src IP" (IP address of a transmitting source). The depth represents the position of the information to be extracted from a packet in controlling a transfer of the packet by the depth from the head of packet, such as "00" (L2) and "01" (L3). That is, an association of "MAC SA" and "00" (L2) means that, since the information to be extracted from the packet is a MAC address, the depth of the information to be extracted is the depth of layer 2.

The depth deriving unit 160 derives the depth of the information to be extracted from the input packet. Specifically, the depth deriving unit 160 searches the depth storage unit 150 by using a pattern stored in the pattern storage unit 121 to obtain the depth stored in association with the pattern, thereby deriving the depth of the information to be extracted from the input packet. The depth deriving unit 160 then transfers the derived depth to the extraction-end determining unit 111.

Depth deriving by the depth deriving unit 160 is explained by using FIG. 3. As depicted in FIG. 3, the depth deriving unit 160 searches the depth storage unit 150 by using a pattern "pat1" to obtain the depth stored in association with the pattern "pat1". Here, the port "p1" represents information collectively representing port numbers of receiving ports with a type of information to be extracted from the packet being "pat1". Therefore, the depth deriving unit 160 distributes the obtained depth over the port numbers corresponding to "p1". Here, in the example of FIG. 3, the depth may seem to be distributed over all ports from "port 1" to "port 4", but this is not meant to be restrictive. The depth is distributed over only the port number(s) corresponding to "p1".

Next, the depth deriving unit 160 finds a maximum value of the distributed depth for each port number, thereby deriving a depth for each port. For example, as depicted in FIG. 3, when depths D1, D2, D3, and D4 are distributed for the port 4, the depth deriving unit 160 finds a maximum value of D1, D2, D3, and D4 through OR (logical OR) operation. The depth deriving unit 160 then derives a maximum value as the depth of port 4.

As depicted in FIG. 2, the unauthorized-packet detecting unit 170 includes an unauthorized-packet-condition storage unit 171 to detect an unauthorized packet.

The unauthorized-packet-condition storage unit 171 stores a condition indicating that the packet is an unauthorized packet. For example, the unauthorized-packet-condition storage unit 171 stores a condition indicating that a packet with its transmitting-source address and transmitting-destination address being identical to each other is an unauthorized packet. The unauthorized-packet detecting unit 170 searches the unauthorized-packet-condition storage unit 171 by using the information extracted by the packet analyzing unit 110. When a condition satisfied by the extracted information is found, the unauthorized-packet detecting unit 170 informs the packet analyzing unit 110 and the switching unit 200 that an unauthorized packet has been detected.

Figure 4:
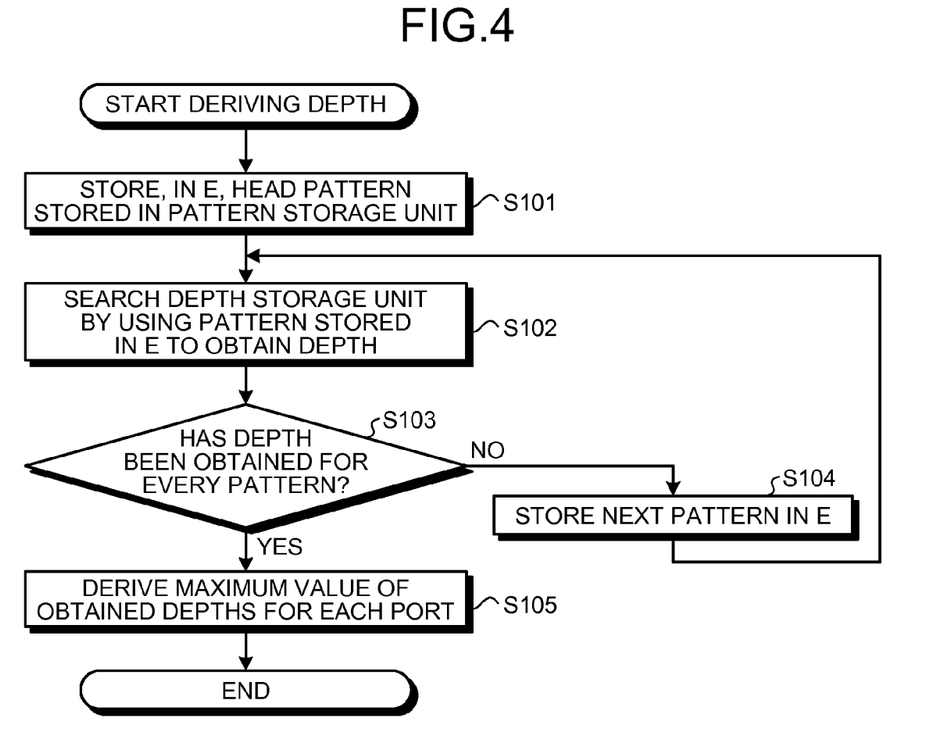
FIG. 4 is a flowchart of the procedure of a depth deriving process.
Figure 5:
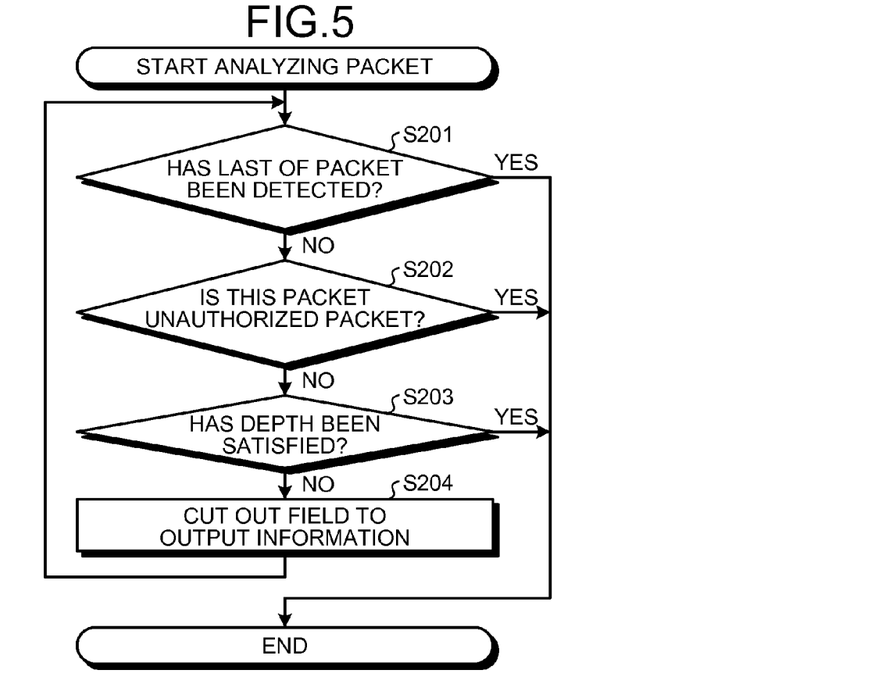
FIG. 5 is a flowchart of the procedure of a packet analyzing process.
Figure 6:
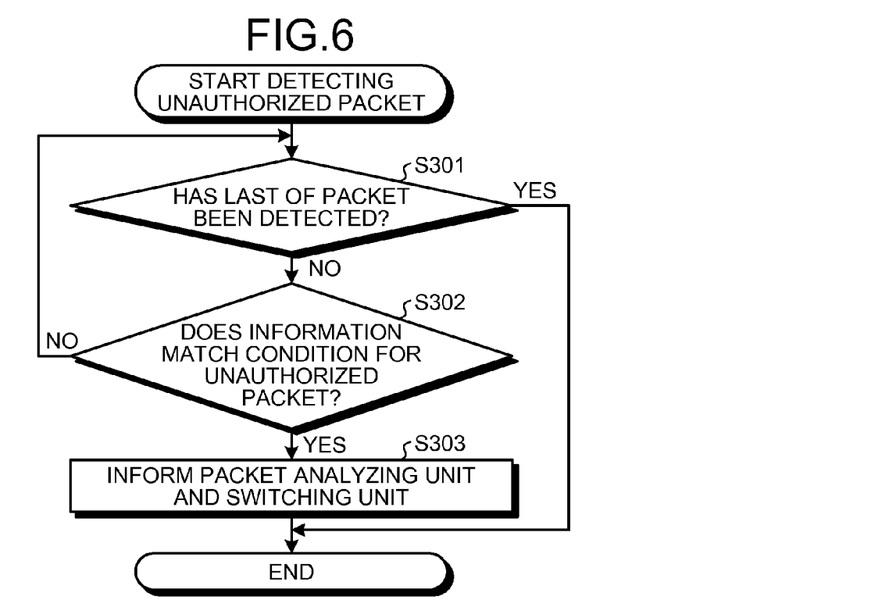
FIG. 6 is a flowchart of the procedure of an unauthorized-packet detecting process.

Next, by using FIGS. 4 to 6, the process procedure by the packet transfer controlling apparatus according to the first embodiment is explained. FIG. 4 is a flowchart of the procedure of a depth deriving process. FIG. 5 is a flowchart of the procedure of a packet analyzing process. FIG. 6 is a flowchart of the procedure of an unauthorized-packet detecting process.

First, referring to FIG. 4, the depth deriving unit 160 stores, in E (entry), a head pattern stored in the pattern storage unit 121 (step S101).

Next, the depth deriving unit 160 searches the depth storage unit 150 by using the pattern stored in E to obtain a depth (step S102).

Then, the depth deriving unit 160 determines whether a depth has been obtained for every pattern (step S103). If a depth has not yet been obtained for every pattern ("No" at step S103), the next pattern is stored in E (step S104), and then the procedure returns to the process of searching the depth storage unit 150.

On the other hand, if a depth has been obtained for every pattern ("Yes" at step S103), the depth deriving unit 160 derives a maximum value of the depths for each port (step S105), and then the procedure ends.

Next, referring to FIG. 5, the packet analyzing unit 110 determines whether the last of the packet has been detected (step S201). If the last of the packet has been detected ("Yes" at step S201), the procedure ends.

On the other hand, if the last of the packet has not been detected ("No" at step S201), the packet analyzing unit 110 next determines whether the packet is an unauthorized packet (step S202). That is, the packet analyzing unit 110 determines whether the packet analyzing unit 110 has been informed by the unauthorized-packet detecting unit 170 that an unauthorized packet has been detected. When determining the packet is an unauthorized packet ("Yes" at step S202), the packet analyzing unit 110 ends the procedure.

On the other hand, when not determining that the packet is an unauthorized packet ("No" at step S202), the packet analyzing unit 110 determines whether the depth has been satisfied (step S203). Specifically, the packet analyzing unit 110 determines whether the extracted information is positioned at a location deeper than the depth derived by the depth deriving unit 160.

When determining that the extracted information is positioned at a location deeper than the derived depth ("Yes" at step S203), the packet analyzing unit 110 ends the procedure.

On the other hand, when determining that the extracted information is not yet positioned at a location deeper than the depth ("No" at step S203), the packet analyzing unit 110 extracts information by cutting out the next field of the packet for output to the pattern matching unit 120 (step S204). The procedure then returns to the process of determining whether the last of the packet has been detected.

Next, referring to FIG. 6, the unauthorized-packet detecting unit 170 determines whether the last of the packet has been detected (step S301). If the last of the packet has been detected ("Yes" at step S301), the procedure ends.

If the last of the packet has not been detected ("No" at step S301), the unauthorized-packet detecting unit 170 determines whether the information extracted by the packet analyzing unit 110 matches the condition for an unauthorized packet (step S302). Specifically, the unauthorized-packet detecting unit 170 searches the unauthorized-packet-condition storage unit 171 by using the information extracted by the packet analyzing unit 110 to determine whether the condition satisfied by the extracted information is found.

When the information does not match the condition for an unauthorized packet ("No" at step S302), the unauthorized-packet detecting unit 170 returns to the process of determining whether the last of the packet has been detected. When the information matches the condition for an unauthorized packet ("Yes" at step S302), the unauthorized-packet detecting unit 170 informs the packet analyzing unit 110 and the switching unit 200 that an unauthorized packet has been detected (step S303), and then the procedure ends.

As explained above, according to the first embodiment, the packet transfer controlling apparatus includes a depth storage unit that stores a pattern and a depth in association with each other. Upon accepting a setting of a pattern, the packet transfer controlling apparatus searches the depth storage unit by using the accepted pattern to obtain the depth stored in association with the pattern, thereby deriving the depth of the information to be extracted from the input packet. Also, upon accepting an input of a packet, the packet transfer controlling apparatus extracts information sequentially from the head of the packet. At this time, the packet transfer controlling apparatus determines whether the extracted information is positioned at a location deeper than the derived depth. When determining that the information is not yet positioned at a location deeper than the depth, the packet transfer controlling apparatus continues extraction of information. When determining that the information is positioned at a location deeper than the depth, the packet transfer controlling apparatus ends extraction of information.

Thus, according to the first embodiment, latency in association with extraction of information can be reduced. That is, packet analysis is performed as required according to pattern settings. Therefore, when the packet analysis depth is shallow, latency in a packet analyzing process can be reduced. For example, when pattern matching can be performed only with a destination MAC (Media Access Control) address of an Ethernet (registered trademark) packet, the pattern analyzing unit can analyze only the first six octets. However, when the pattern analyzing unit analyzes up to the destination port of a Transmission Control Protocol (TCP) header across the board, analysis of 38 octets is required at the shortest. When an extension header is added in IPv6 (Internet Protocol v.6), analysis has to be carried out further deeper.

Also, according to the first embodiment, the packet analysis depth can be automatically calculated by hardware, thereby reducing load on software.

Furthermore, according to the first embodiment, the packet transfer controlling apparatus includes an unauthorized-packet-condition storage unit that stores a condition indicating that the packet is an unauthorized packet. When information is extracted, the packet transfer controlling apparatus searches the unauthorized-packet-condition storage unit by using the extracted information. When a condition satisfied by the extracted information is found, extraction of information ends. Here, an access controlling process is not required in an environment where an unauthorized packet is discarded. In this case, according to the first embodiment, packet analysis can be terminated, thereby reducing latency due to a packet analyzing process.

Still further, according to the first embodiment, the packet transfer controlling apparatus derives a depth for each receiving port, and determines based on the receiving port of the extracted information whether the information is positioned at a location deeper than the depth. Thus, according to the first embodiment, the depth for analyzing the packet in units of port can be optimized. That is, even when a port requiring a deep packet analysis is present, latency due to a packet analyzing process is not increased at a port not requiring such a deep packet analysis.

While the embodiment of the present invention has been explained in the foregoing, the present invention may be implemented in various embodiments other than those explained above.

In the first embodiment, the packet transfer controlling apparatus performs control of ending packet analysis when being informed by the unauthorized-packet detecting unit of detection of an unauthorized packet. However, this is not necessarily mandatory. That is, for the meanwhile, the packet transfer controlling apparatus may analyze the packet up to the depth derived according to the pattern irrespectively of whether the unauthorized-packet detecting unit detects an unauthorized packet.

Also, in the first embodiment, the packet transfer controlling apparatus derives the depth for each receiving port. However, this is not meant to be restrictive, and the packet transfer controlling apparatus may derive the depth for the whole apparatus.

In the first embodiment above, the technique is explained in which the packet transfer controlling apparatus sets an access control list on a receiving port side. However, the present invention is not restricted to this, and can be applied to a technique of setting an access control list on a transmitting port side.

Among the processes explained in the embodiments above, all or part of the processes explained as being automatically performed may be manually performed, or all or part of the processes explained as being manually performed may be automatically performed through a known method. In addition, the process procedure, the control procedure, specific names, and information including various data and parameters herein and in the drawings can be arbitrarily changed unless otherwise specified.

For example, in the first embodiment, the information extracted at step S204 depicted in FIG. 5 is a target for determination at step S203 in the next process. That is, the extracting process proceeds, and the process of determining the extracted information follows. However, the present invention is not restricted to this, and the procedure may be such that the determining process is performed before the extracting process and the extracting process is not performed according to the determination result. In other words, any specific procedure can be taken as long as the technique is such that the process of extracting information from a packet is controlled based on the depth calculated in advance.

Furthermore, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. Still further, all or arbitrary part of the process function performed in each component can be achieved by a Central Processing Unit (CPU) and a program analyzed and executed on that CPU, or can be achieved as hardware with a wired logic.

Here, the packet transfer controlling method explained in the embodiments can be achieved by executing a program prepared in advance on a computer, such as a personal computer or work station. This program can be distributed over a network, such as the Internet. Also, this program can be recorded on a computer-readable recording medium, such as a hard disk, flexible disk (FD), compact-disk read only memory (CD-ROM), magneto-optical disk (MO), and digital versatile disk (DVD), and can be read by the computer from the recording medium for execution.

According to the present invention, latency in association with extraction of information can be reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A packet transfer controlling apparatus comprising: a depth storage hardware unit that stores, in controlling transfer of a packet, a pattern indicative of a type of information to be extracted from the packet and a depth from a head of the packet, the depth being indicative of a position of the information to be extracted, and the pattern and the depth being stored in association with each other;

a depth deriving unit that derives, when a setting of the pattern is accepted, the depth of the information to be extracted from the input packet by searching the depth storage unit based on the pattern and obtaining the depth stored in association with the pattern;

an extracting unit that sequentially extracts the information from the head of the packet when the input of the packet is accepted; and a determining unit that determines whether the information extracted by the extracting unit is positioned at a location deeper than the depth derived by the depth deriving unit, and controls to continue the information extraction by the extracting unit when determining that the information is not yet positioned at the location deeper than the derived depth, and to end the information extraction by the extracting unit when determining that the information is positioned at the location deeper than the derived depth.

2. The packet transfer controlling apparatus according to claim 1, further comprising:

an unauthorized-packet-condition storage unit that stores a condition indicating that the packet is an unauthorized packet; and an unauthorized-packet ending unit that searches, when the information is extracted by the extracting unit, the unauthorized-packet-condition storage unit by using the extracted information and ends the information extraction by the extracting unit when a condition satisfied by the extracted information is found.

3. The packet transfer controlling apparatus according to claim 1, wherein the depth deriving unit derives the depth for each receiving port, and the determining unit determines whether the information is positioned at the location deeper than the depth derived by the depth deriving unit based on a receiving port of the information extracted by the extracting unit.

4. A packet transfer controlling method comprising:

deriving, in controlling transfer of a packet, when a setting of a pattern indicative of a type of information to be extracted from the packet is accepted, a depth of the information to be extracted from the input packet by searching a depth storage unit based on the accepted pattern, the depth storage unit storing the pattern and the depth, the depth being indicative of a position of the information to be extracted, and the pattern and the depth being stored in association with each other, and by obtaining the depth stored in the depth storage unit in association with the pattern;

extracting the information from a head of the packet in sequence when the input of the packet is accepted; and determining whether the extracted information is positioned at a location deeper than the derived depth, and controlling to continue the information extraction when determining that the information is not yet positioned at the location deeper than the derived depth, and to end the information extraction when determining that the information is positioned at the location deeper than the derived depth.

* * * * *